Figure 1:
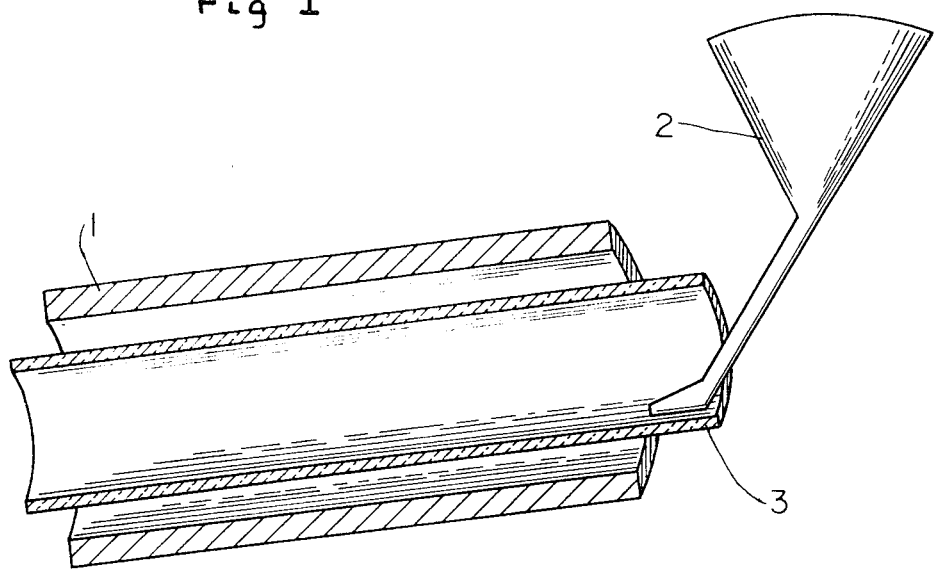

United States Patent
Fitzmaurice et al.

[15] 3,665,013
[45] May 23, 1972

[54] PRODUCTION OF COUMARIN DERIVATIVES BY A CONTINUOUS METHOD

[72] Inventors: Colin Fitzmaurice, Holmes Chapel; Robert Minshull, Brereton, both of England

[73] Assignee: Fisons Pharmaceuticals Limited, Loughborough, England

[22] Filed: Dec. 22, 1967

[21] Appl. No.: 692,812

[30] Foreign Application Priority Data

Dec. 22, 1966  Great Britain.......................57,534/66

[52] U.S. Cl. .......................................260/343.2 R, 260/592
[51] Int. Cl. ...........................................................C07d 7/28
[58] Field of Search.......................................260/343.2, 592

[56] References Cited

UNITED STATES PATENTS 2,964,532   12/1960   Klenke................................260/314.5

OTHER PUBLICATIONS

Limaye, Berichte, Vol. 65 (1932), pages 375– 377.
Limaye et al., Chem. Abstracts, Vol. 28 (1935), page 1684.
Bruce et al., J. Chem. Soc. (1953), pp. 2403– 2406.

*Primary Examiner*—James A. Patten
*Attorney*—Wenderoth, Lind & Ponack

[57] ABSTRACT

The known Fries rearrangement reaction used for the preparation of 4-alkyl, aryl or aralkyl-7-hydroxy-8-acyl coumarins from corresponding 4-alkyl, aryl or aralkyl-7-acyloxy coumarins is effected in a continuous manner using apparatus in which a thin film of the molten reaction mixture is moved continuously over a heated surface. The customary Fries catalyst is preferably mixed with another thermally stable salt so that its melting point may be lowered.

13 Claims, 2 Drawing Figures

Patented May 23, 1972  3,665,013

COLIN FITZMAURICE AND
ROBERT MINSHULL, INVENTORS

BY Wenderoth, Lind + Ponack.

ATTORNEYS

PRODUCTION OF COUMARIN DERIVATIVES BY A CONTINUOUS METHOD

The present invention relates to the preparation of 4-alkyl, aryl or aralkyl-7-hydroxy-8-acyl coumarins, especially 4-methyl-7-hydroxy-8-acetyl coumarin.

Such substituted coumarins have hitherto been prepared by a batch process using the Fries rearrangement reaction. The reaction mixture during such a process is very viscous and there is poor heat transfer through the mixture. The reaction has therefore been carried out only on a small scale and under constant supervision. It has not hitherto been considered possible to carry out the reaction on a continuous scale in view of the excessive viscosity of the reaction mixture. We have now found that if the reaction is carried out in a moving film reactor, reactants may be continuously introduced into and product continuously removed from the reactor thus enabling the reaction to be carried out continuously. Such a continuous process does not require the detailed supervision that earlier batch processes required and enables the product to be produced at a commercially attractive price.

Accordingly the invention provides a process wherein a 4-alkyl, aryl, or aralkyl, -7-aceloxy coumarin is rearranged under the influence of heat in the presence of a Fries catalyst to yield the corresponding 4-alkyl, aryl or aralkyl, -7-hydroxy-8-acyl coumarin, the improvement which comprises carrying out the rearrangement continuously by passing a film of a molten mixture of the reactant coumarin and Fries catalyst over a heated surface.

The reactor for present use in one wherein a film of the molten reaction mixture moves over a heated surface. In view of the very viscous nature of the reaction mixture it is usually desirable that the film, when formed, be driven across the heated surface. This may be achieved by scraper bars moving across a flat surface or by the action of an archimedean screw within a heated tubular reactor. A preferred form of reactor however has no scrapers but consists of a rotating inclined tubular reactor wherein movement of the reaction mixture through the reactor is achieved by the combination of the rotation and inclination of the tube. A particularly preferred reactor is a glass tube having an internal diameter of about 2 inches (5 mm.) and a length of about 8 feet (2.4 meters), which is inclined at an angle of about 1.5° to the horizontal and is adapted to be rotated. It will be appreciated that the dimensions of the reactor, the clearance between the scrapers and the heated surface, the inclination and speed of rotation of the reactor may be varied to suit the reaction mixture fed thereto. It is preferred that the variables be such that the residence time of the reaction mixture on the heated surface be in excess of one minute, preferably from 2 to 4 minutes, to ensure that an adequate degree of rearrangement takes place.

As indicated above, the surface over which the molten reaction mixture moves is heated. The method by which such heating is achieved is conventional, for example by electrical or other means. In the case of a rotating tubular glass reactor it is preferred to use infra-red heating. The heating means will, to some extent be determined by the melting point of the reaction mixture. As indicated below, it is preferred to melt the reactants in the reactor itself and it is therefore preferred to provide the reactor with an initial portion which is not subjected to direct heat and which is adapted to receive the reactants and to spread them out before they enter the directly heated portion of the reactor. This initial portion may comprise a funnel feeding material onto an unheated part of a hot plate from which the materials are spread onto the hot plate by the action of the scrapers referred to above or by separate feed mechanism. In the case of a tubular furnace the initial portion may be merely an unheated portion of the tube, the rotation or archimedean screw accomplishing the spreading of the reactants as they pass through the reactor.

The reactant-substituted coumarins for present use are those possessing an acyloxy substituent in the 7 position and are not substitute in the 8 position. They also possess one alkyl, aryl or aralkyl substituent in the 4 position. Suitable coumarins include those wherein the acyloxy substituent is derived from a fatty acid containing from two to 10 carbon atoms, for example acetoxy, propionoxy, caproxy and capryloxy group; those wherein the alkyl substituent contains up to 12 carbon atoms, for example a methyl, ethyl, propyl, butyl, hexyl, decyl or lauryl group; those wherein the aryl group is a mono-benzenoid or dibenzenoid ring such as a naphthalene ring which may contain alkyl stituents such as methyl, ethyl, propyl, butyl or hexyl groups; and and those wherein the aralkyl group is a benzyl, phenylethyl or benz-hydryl group. Particularly preferred reactant coumarins are those having a lower alkyl group containing from one to four carbon atoms in the 4 position and an acetoxy;propionoxy or butyroxy group in the 7 position; especially 4-methyl-7-acetoxy coumarin.

The reactant coumarins may be prepared in known manner, for example by acylation of the corresponding 7-hydroxy coumarin. Thus, 4-methyl-7-hydroxy coumarin, which itself has been prepared by the reaction of resorcinol with a substantially equimolecular amount of ethylacetoacetate in the presence of a small amount of concentrated sulphuric acid, may be reacted in the usual manner with acetic anhydride to yield 4-methyl-7-acetoxy coumarin.

The catalyst used to bring about rearrangement of the substituted coumarin may be any of those normally used in the Fries rearrangement. Such catalysts include aluminum trihalide, especially aluminum trichloride; mercuric halides; stannic halides; ferric halides; chromic halides; lanthanum tribromide and titanium tetrabromide; or mixtures thereof, e.g., a mixture of ferric and aluminum chlorides. The preferred catalyst is aluminum trichloride. The amount of catalyst employed is usually at least 4 mols per mol of coumarin to be rearranged. Whilst there is no upper limit to the amount which may be employed, we prefer to use from 4 to 8 mols of catalyst per mol of coumarin, especially 6.5 mols.

Since the reaction mixture is to be passed as a molten film over the heated surface, it is preferred to reduce the comparatively high melting point of the Fries catalyst in order to carry out the process at an acceptable temperature level. This may readily be done by forming eutectic mixtures of the catalyst with alkali metal or alkaline earth metal salts, such as the halides or salts of thermally stable inorganic or organic acids, e.g., NaCl NH$_4$Cl, KCl, CaCl$_2$, SrCl$_2$, BaCl$_2$, ZnCl$_2$, and sodium acetate. Such eutectics may be formed merely by mixing the powdered catalyst and salt in the desired proportions and feeding such a mixture to the reaction vessel. Alternatively, the eutectic may be formed by adding the salt to a molten bath of the catalyst and then grinding the product when cool. The proportion of catalyst to salt in the eutectic may vary over a wide range depending upon the temperature at which it is desired to operate the rearrangement process.

The eutectic must contain sufficient free Fries catalyst to carry out the rearrangement. Thus, where a complex of the catalyst and the added salt is formed, the eutectics of such a mixture which may be used are those containing excess catalyst over and above that required to form the complex. In the case of an aluminum chloride catalyst, this forms an equimolecular double salt with alkali-metal halides such as sodium chloride and therefore, when making a eutectic of suitable melting point for present use, there must be used at least 4 plus $n$ mols of aluminum chloride, where $n$ is the number of mols of sodium chloride present, since at least 4 mols of free catalyst are usually required to bring about the rearrangement.

The catalyst employed is preferably substantially anhydrous. Small amounts of water may be present in the initial reactants. However, excessive amounts should be avoided since water may hydrolyze the catalyst employed, particularly where this is an aluminum halide, with attendant loss of efficiency in the process. Where eutectics of the catalysts are employed it is also preferred to use substantially anhydrous materials in their preparation.

An especially preferred mixture of reactant coumarin and catalyst for present use is one containing about 1 mol of reactant coumarin, 6.54 mols of aluminum chloride and 1.86 mols of sodium chloride.

In carrying out the process of the invention the catalyst and the coumarin to be rearranged are mixed together in the desired proportions and the mixture then fed to the reactor where it forms a moving film of molten material. The mixing may take place merely by stirring together powders of the various constituents. As an alternative, separate streams of powders of the reactants may be fed to the reactor and mixing allowed to take place in the reactor. Melting of the reactants may take place before they are fed to the reactor or during their passage through the reactor. As indicated above, it is preferred to feed the powdered reactants to an initial portion of the reactor which is not subjected to direct heat and to raise the temperature of the reactants to the reaction temperature, which is above their melting point, by moving them along the reactor.

The temperature during rearrangement of the reactant coumarin must be sufficient to melt all the components of the reaction mixture. As indicated above, Fries catalysts may have an excessively high melting point and formation of eutectics therewith is usually necessary. The eutectic should desirably have a melting point below 160° to 200° C., preferably below 180° C., since these are the optimum operating temperatures for the Fries rearrangement and those to which the heated surfaces of the reactor are heated.

During passage of the reactants along the reaction vessel, rearrangement takes place. The rate of rearrangement is dependant upon the temperature in the reactor. If this is maintained at a constant level, variation of the other reaction variables such as rate of feed of reactants to the reactor, rate of movement of scrapers across the heated surfaces of the reactor, etc., may be made in order to achieve the optimum residence time of the mixture in the reactor to secure adequate rearrangement. We have found that the use of a rotating tubular reactor of the particularly preferred size heated to 180° C. and rotated at 100 r.p.m. provides satisfactory results when the especially preferred mixture of reactant coumarin and catalyst is fed to the reactor at the rate of 16 kgs./hour.

The product issuing from the reactor contains the Fries catalyst, original reactant coumarin and the rearranged coumarin product. The coumarin product may be recovered from this mixture in the conventional manner, for example by feeding the mixture to an ice/water/hydrochloric acid mixture and recovering the precipitated coumarin product by filtration, centrifuging or other means. The coumarin product may then be purified by, for example, recrystallization from a suitable solvent, such as methylated spirit, or by other conventional means.

The coumarins produced by the process of the present invention find use as intermediates in the preparation of a variety of organic chemicals. For example, 4-methyl-7-hydroxy-8-acetyl coumarin serves as an intermediate in the preparation of 2,6-dihydroxyacetophenone, to which latter it may be converted in known manner by hydrolysis with an aqueous alkali such as aqueous sodium hydroxide. The present invention thus also provides a process for the preparation of 2,6-dihydroxyacetophenone which comprises converting 4-methyl-7-acetoxy coumarin to 4-methyl-7-hydroxy-8-acetyl coumarin by the process of the invention and thereafter hydrolyzing the coumarin product.

The invention will now be illustrated by the following example.

a. 4-methyl-7-hydroxy coumarin

Ten kg. Resorcinol, 11.8 kg. ethyl acetoacetate and 30 ml. concentrated sulphuric acid are mixed in a 50-liter flask fitted for vacuum disillation. The mixture is heated until most of the ethanol formed in the reaction has distilled off and the residue has set solid. Vacuum is then applied to remove the last traces of ethanol and any surplus ester.

b. 4-methyl-7-acetoxy coumarin

To the warm solid from (a) above is added 25 liters of acetic anhydride. The mixture is heated to the boiling point, kept there for 10 minutes, cooled to below 100° C. and poured, with stirring, into 30 gals. of ice water. The precipitate is filtered, washed with cold water, and dried. It is recrystallized from 100 liters of ethanol to yield 17.8 kg. (90 percent) of 4-methyl-7-acetoxy coumarin.

c. 4methyl-7-hydroxy-8-acetyl coumarin

A mixture of the dry, finely powdered acetoxy coumarin from (b) above, anhydrous aluminum chloride and sodium chloride is made in the ratio of 2:8:1. This is fed at the rate of about 16 kg. of mixture per hour into a reactor unit consisting of a revolving glass tube (100 r.p.m.) 8 ft. long × 2 ins. internal diameter which is inclined at an angle of 1½° and which is heated to a temperature of 170°–180° C. by means of infra-red heating strips over about 90 percent of its length. The mixture melts to a free flowing liquid which is run into a stirred mixture of ice, water and concentrated hydrochloric acid (approx. 1:2:0.1), additional ice being added as required to moderate the temperature. The precipitate is filtered, washed with water, and dried. It is recrystallized from boiling ethanol (20 liters per kilogram dried product) to obtain 4-methyl-7-hydroxy-8-acetyl coumarin in 70 percent yield (based on acetoxy compound).

d. 2,6-dihydroxyacetophenone

Into a stirred suspension of 7 kg. of 4-methyl-7-hydroxy-8-acetyl coumarin, in 23 liters of water in a 100-liter flask fitted with a reflux condenser and nitrogen inlet, is run a solution of 6.1 kg. of sodium hydroxide in 27 liters water, while maintaining a blanket of nitrogen. The mixture is boiled under reflux for 5 hours, cooled, and carefully acidified with approximately 15 liters of concentrated hydrochloric acid diluted with 15 liters of water. The precipitate is filtered, washed with water and dried. It is recrystallized from aqueous ethanol, using 1 liter ethanol for each 95 g. solid and diluting with 800 ml. water, to obtain a first crop of 3 kg. of 2,6-dihydroxyacetophenone and a further 1.2 kg. after concentrating the liquors giving a total yield of 85 percent from the coumarin.

Figure 2:
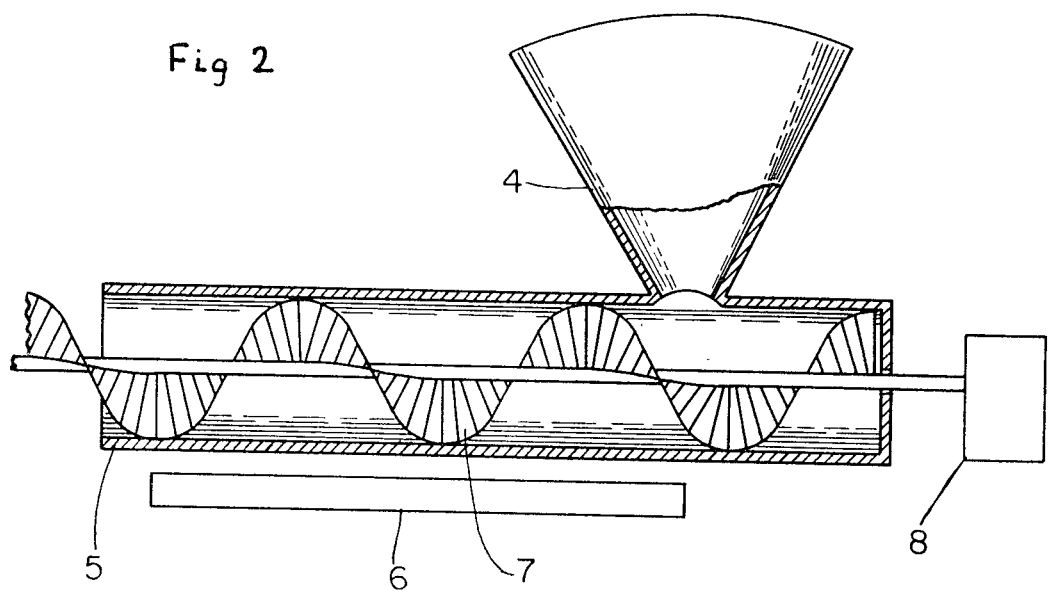

On the accompanying sheet of drawing,

FIG. 1 is a part-sectional diagrammatic representation of one form of apparatus for carrying out the process of the invention including a heated tubular glass reaction vessel; and FIG. 2 is a similar diagrammatic representation of an alternative embodiment of apparatus.

Operation of the two embodiments is clear from the descriptions hereinbefore set forth.

We claim:

1. In a process wherein a 4-alkyl, aryl or aralkyl -7-acyloxy coumarin is rearranged under the influence of heat in the presence of a Fries catalyst to yield the corresponding 4-alkyl, aryl or aralkyl-7-hydroxy-8-acyl coumarin, the improvement which comprises carrying out the rearrangement continuously by feeding a mixture of the reactant coumarin, the Fries catalyst and thermally stable alkalimetal or alkaline earth metal salt of an organic or inorganic acid to the interior of a rotated slightly inclined heated tubular reaction vessel.

2. A process according to claim 23 wherein the Fries catalyst is selected from aluminum halides, mercuric halides; stannic halides; ferric halides; chromic halides; lanthanum tribromide and titanium tetrabromide.

3. A process according to claim 23 wherein the Fries catalyst is present in at least 4 molar proportions per molar proportion of the reactant coumarin.

4. A process according to claim 1 wherein the reactant coumarin is one wherein the acyloxy substituent is derived from a fatty acid containing from two to 10 carbon atoms; wherein the alkyl substituent contains up to 12 carbon atoms or the aryl substituent is a monobenzenoid or dibenzenoid ring or the aralkyl substituent is a benzyl, phenylethyl or benzhydryl group.

5. A process according to claim 1 wherein the reactant coumarin is one having a lower alkyl group containing from one to four carbon atoms in the 4-position and an acetoxy, propionoxy or butyroxy group in the 7-position.

6. A process as claimed in claim 13 wherein the reactant coumarin is 4-methyl-7-acetoxy coumarin.

7. A process as claimed in claim 6 wherein the aluminum trichloride is admixed with sodium chloride to reduce the melting point of the aluminum trichloride and the mixture passed over the heated surface comprises 1 molar proportion of 4-methyl-7-acetoxy coumarin, 6.54 molar proportions of aluminum trichloride and 1.86 molar proportions of sodium chloride.

8. In a process wherein a 4-alkyl-7-acyloxy coumarin selected from those wherein the alkyl groups contain from one to four carbon atoms and the acyloxy groups are selected from acetoxy, propionoxy and butyroxy groups, is rearranged under the influence of heat in the presence of anhydrous aluminum trichloride to yield the corresponding 4-alkyl-7-hydroxy-8-acyl coumarin the improvement which comprises carrying out the rearrangement continuously by feeding a mixture comprising 1 molar proportion of the reactant coumarin and from 4 to 8 molar proportions of the anhydrous aluminum trichloride and a small amount of a thermally stable salt to a heated tubular reactor which is inclined to the horizontal and is rotated.

9. A process according to claim 8 wherein sodium chloride is added to the aluminum trichloride to reduce its melting point and the mixture fed to the reactor comprises 1 molar proportion of the reactant coumarin, 6.54 molar proportions of the aluminum trichloride and 1.86 molar proportions of sodium chloride.

10. A process according to claim 9 wherein the rearrangement is carried out at from 160° to 200° C.

11. A process according to claim 1 wherein the 4-alkyl, aryl or aralkyl, -7-hydroxy-8-acyl coumarin product is recovered from the reaction mixture by feeding the latter into a mixture of ice, water and hydrochloric acid and separating the precipitated coumarin product.

12. A process according to claim 7 wherein the 4-methyl-7-hydroxy-8-acetyl coumarin is recovered from the reaction mixture by feeding this latter into a mixture of ice, water, and hydrochloric acid; separating the precipitated coumarin product, and subsequently hydrolyzing the recovered product with alkali to yield 2,6-dihydroxy-acetophenone.

13. A process according to claim 1 wherein the catalyst in anhydrous aluminum trichloride and 4 to 8 molar proportions thereof are admixed with one molar proportion of the reactant coumarin.

* * * * *